(12) United States Patent
Boillot

(10) Patent No.: US 8,169,404 B1
(45) Date of Patent: May 1, 2012

(54) METHOD AND DEVICE FOR PLANARY SENSORY DETECTION

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 911 days.

(21) Appl. No.: 11/839,323

(22) Filed: Aug. 15, 2007

Related U.S. Application Data

(60) Provisional application No. 60/837,685, filed on Aug. 15, 2006.

(51) Int. Cl.
*G09G 5/00* (2006.01)
*G06F 3/033* (2006.01)

(52) U.S. Cl. ........................................ 345/158; 345/156

(58) Field of Classification Search .......... 345/156–158, 345/173–183
See application file for complete search history.

(56) References Cited

U.S. PATENT DOCUMENTS

| | | | |
|---|---|---|---|
| 4,796,019 A * | 1/1989 | Auerbach | ...................... 345/169 |
| 5,274,363 A | 12/1993 | Koved | |
| 6,095,928 A * | 8/2000 | Goszyk | ........................ 473/222 |
| 6,130,663 A | 10/2000 | Null | |
| 6,137,427 A | 10/2000 | Binstead | |
| 6,313,825 B1 | 11/2001 | Gilbert | |
| 6,937,227 B2 | 8/2005 | Qamhiyah | |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 2003/0132913 A1 | 7/2003 | Issinski | |
| 2006/0092022 A1 | 5/2006 | Cehelnik | |
| 2006/0161871 A1 | 7/2006 | Hotelling | |
| 2006/0164241 A1 | 7/2006 | Makela | |
| 2006/0224429 A1 | 10/2006 | Mathew | |
| 2006/0256090 A1 | 11/2006 | Huppi | |
| 2007/0127039 A1 | 6/2007 | Njolstad | |

* cited by examiner

*Primary Examiner* — Kevin M Nguyen
*Assistant Examiner* — Cory Almeida

(57) ABSTRACT

A method and system (500) for generating an approximately planar sensory field (199) and confirming a presence of an object (310) in the field is provided. The system can include at least one paired receiver (121/122) and at least one transmitter (130) in a front and back orientation of a touchless sensing unit (110). The method can include detecting a movement of the object within a sensory space (176/177), estimating a phase angle of the movement; and evaluating whether the phase angle is within a predetermined range (197), and if so, confirming a presence of the object within the approximately planar sensory field.

15 Claims, 7 Drawing Sheets

410

420

430

Length of <OAB = Time of flight for Rx 121
Length of <OBC = Time of flight for Rx 141

440

TIME OF FLIGHTS $\delta\phi = |\phi1 - \phi2|$
phase angle

METHOD AND DEVICE FOR PLANARY SENSORY DETECTION

CROSS-REFERENCE TO RELATED APPLICATIONS

This application claims the priority benefit of U.S. Provisional Patent Application No. 60/837,685 entitled "Method and System for Planar Sensory Detection" filed Aug. 15, 2006, the entire contents of which are hereby incorporated by reference. This application also incorporates by reference the following Utility Application: U.S. patent application Ser. No. 11/683,415, entitled "Virtual Interface Method and System Thereof", filed on Mar. 7, 2007.

FIELD

The present embodiments of the invention generally relate to the field of user interfaces, more particularly to sensory detection.

DESCRIPTION OF THE RELATED ART

Motion detectors can sense movement. Motion detection systems can include radar systems, video camera monitoring systems, and medical diagnostic systems. Motion detection systems generally include sensors which convert a physical signal into an electronic signal. The sensor performs the task of capturing the signal and converting it to a suitable form for processing.

A motion detection system can interpret sensory information from the sensors. An object can be detected in a broad region of the motion detection space from the sensory information. However, the motion detection system may have difficulty discriminating between detection, movement, and control.

SUMMARY

Embodiments of the invention are directed to a method and system for planar sensory detection. The method can include generating an approximately planar sensory field in a sensory space, and detecting a presence of an object in the planar sensory field.

One embodiment can include detecting a movement of an object within a sensory space, estimating a phase angle of the movement, and evaluating whether the phase angle is within a predetermined range. If the phase angle is within the predetermined range, a presence and location of the object within the sensory space can be confirmed. Moreover, the predetermined range can establish a bounds for the approximately planar sensory field. The method can include determining a phase difference between a first echo signal and a second signal and determining whether the phase difference is less than a wavelength for confirming the presence of the object within the sensory space.

In one aspect, a determination can be made that the object is approaching when the phase difference decreases, and a determination can be made that the object is leaving when the phase difference increases. The method can further include tracking a movement of the object in the sensory space, moving a cursor in accordance with the movement, and generating a mouse click action in response to the object approaching, or in response to the object leaving.

In another embodiment a sensing unit for generating a planar sensory field and determining a presence and location of an object in the planar sensory field is provided. The system can include at least one transmitter for transmitting a signal, a first pair of receivers for capturing a first reflection and a second reflection, and a processor. The processor can detect a movement of an object within the sensory space, estimate a phase angle of the movement, and evaluate whether the phase angle is within a predetermined range, and if so, confirm a presence and location of the object within the sensory space. A second pair of receivers can be included for capturing a first reflection and a second reflection of the signal from an object in a sensing space created by the transmitter, wherein the first pair of receivers, the second pair of receivers, and the at least one transmitter are positioned approximately in-line to one another.

In one arrangement, a first receiver and a second receiver of each pair of receivers can be positioned in an approximately front and back orientation with respect to an in-line orientation of the first pair of receivers, the second pair of receivers, and the at least one transmitter. The arrangement allows for generating the approximately planar sensory field and confirming that the object has penetrated an approximately planar sensory field in the sensory space. A movement of the object in the approximately planar sensory field can be tracked, and a cursor object can be controlled in accordance with the tracking a movement in the planar sensory field. A control of the cursor object can cease when the object leaves the planar sensory field.

In yet another embodiment, a method for creating an approximately planar sensing field in a sensory space is provided. The method can include emitting a plurality of ultrasonic signals from a transmitter for generating a sensory space, detecting a movement of an object within the sensory space, estimating a phase angle of the movement, and determining that the object is within an approximately planar sensory field when the phase angle is within a predetermined range. A phase angle between a first echo and a second echo can be evaluated with respect to the predetermined range. If the difference is less than a wavelength, a presence of the object in the approximately planar sensory field can be confirmed. The approximately planar sensory field is generated by constraining the phase difference to be within a predetermined amount, such as a wavelength. In another arrangement, a time difference can be determined between a first time of flight and a second time of flight. A movement of the object can be tracked when a presence of the object is detected within the approximately planar sensory field.

BRIEF DESCRIPTION OF THE DRAWINGS

The features of the embodiments of the invention, which are believed to be novel, are set forth with particularity in the appended claims. Embodiments of the invention, together with further objects and advantages thereof, may best be understood by reference to the following description, taken in conjunction with the accompanying drawings, in the several figures of which like reference numerals identify like elements, and in which:

DETAILED DESCRIPTION

Figure 1:
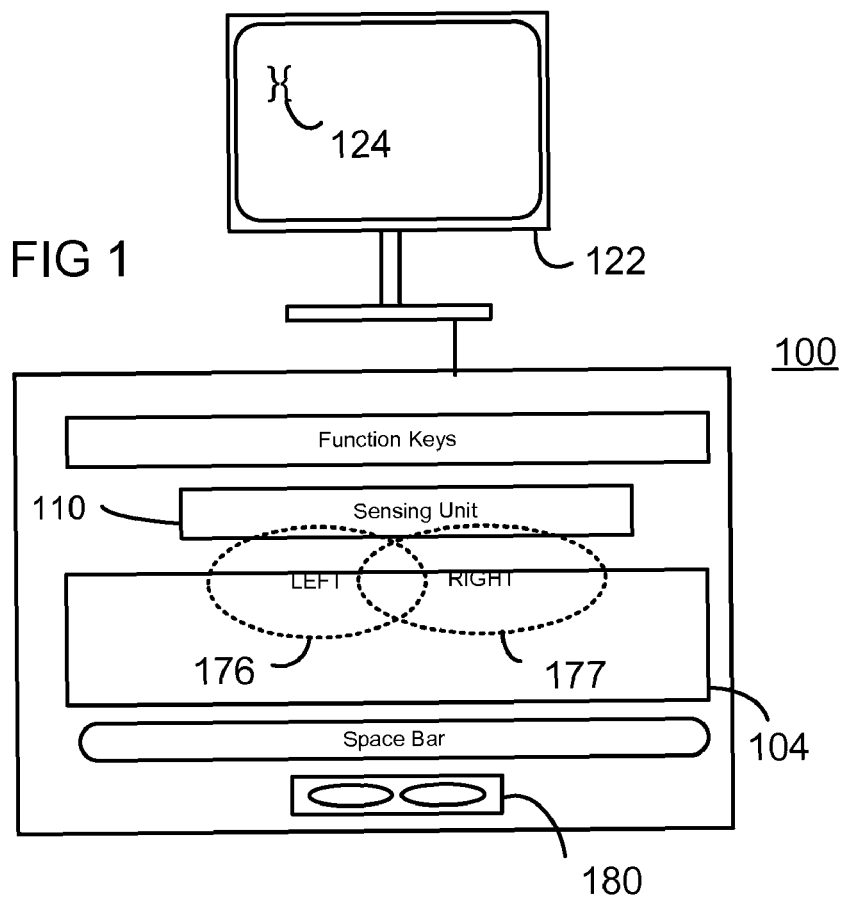
FIG. 1 is an illustration of a touchless sensing unit suitable for use with a communication device in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising. The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

The term "space" and "field" can be defined as exhibiting a two or three-dimensional aspect. The term "sensory space" or "sensory field" can be defined as a two or three-dimensional volume. A "planar field" can be defined as a two-dimensional area. A "phase" can be defined as a measure of absolute or relative time, distance, or angular rotation. An "angle" can be defined as a geometrical separation between two lines, as a phase difference, or a complex phase angle. The term "predetermined proportion" can be defined as a predetermined mathematical relationship, such as a ratio, for example, 1:3.

Briefly, one embodiment of the invention is directed to a touchless sensing unit and method for detecting a presence and location of an object within a sensory space. The object can be a finger, or a stylus, such as a pen. In one aspect, a determination of the object's location in the sensory space can be focused to an approximately planar field in the sensory space. Specifically, the presence of the object in the sensory space can be detected by comparing a phase angle between two echo signals captured by a pair of receivers. An orientation of the receivers is unique to detecting the presence of the object within the planar sensory field. When the phase angle is less that a wavelength, the object can be considered generally equidistant to each of the receivers in the pair. When the phase angle is greater that a wavelength, the object can be considered not equidistant to each of the receivers in the pair.

The orientation of the paired receivers in a front and back arrangement, relative to a non-principal motion of the object's movement, generates a planar two-dimensional field within a three-dimensional space. For example, the pair of receivers can be positioned in a forward and backward orientation such that a position of the object directly over the receivers is within the approximately planar field and a presence of the object in the approximately planar sensory field can be confirmed by evaluating the phase difference.

Another embodiment of the invention is directed to a method and system for generating an approximately planar sensory field within a sensory space. A transmitter and a pair of receivers can generate a sensory space that can be intentionally constricted to an approximately planar sensory field. An object within the sensory space will produce two echo returns. The echo returns can be evaluated to determine if a phase angle of a first echo return and a second echo return are within a predetermined range. The phase angle can be evaluated to determine whether the object is within one or more planar sensory fields of the sensory space. An object producing a phase difference greater than the predetermined range is considered outside of the planar sensory field. An object producing a phase difference less than the predetermined range can be considered inside the planar sensory field. Notably, the approximately planar sensory field can be generated by constraining the detection of objects to within a predetermined phase angle, which may be as small as a wavelength.

Referring to FIG. 1, an exemplary embodiment of a motion sensing system is shown. As illustrated the motion sensing system can include a keyboard 100 for providing touchless cursor control. The motion sensing system can also be used with a mobile communication device, portable music player, navigation system, medical system, or any other user interface device or system. In the exemplary illustration, a touchless sensing unit 110 can be attached to the keyboard 100 or integrated within the keyboard 100. The sensing unit 110 is shown within the context of a keyboard 100 for illustrating one example of generating a planar sensory field and detecting an object in the planar sensory field. The sensing unit 110 captures motion detection signals, or control signals, which can be communicated to a display 122.

As an example, the sensing unit 110 can detect finger motion above the keyboard 100 in the left area 176 and/or the right area 177. Notably, the user does not need to touch the sensing unit 110. The sensing unit 110 can detect finger movement in air. The sensing unit 110 is a touchless device that detects motion when the hands and fingers are within proximity of the sensing unit 110. The sensing unit 110 can detect movement over the keys 104 from the left hand within the volumetric region 176 and movement from the right hand within the volumetric region 177. The extent of the region is not limited to the sizes illustrated in 176 and 177, which are two-dimensional projections of three-dimensional volumetric regions for illustration. The sensing unit 110 can also detect general finger movements when the hands are positioned in a general typing position above the keyboard 100.

As an example, a user typing at the keyboard 100, can momentarily pause, raise a finger, and control a cursor object 124 on the display 122. In one arrangement, the user can issue a mouse single click or double click by hitting a button on the button pad 180 below the space bar. Alternatively, the user may project the finger that is controlling the cursor 124 forward to issue a mouse click, or perform some other activation gesture. For example, the user can raise a finger in the volumetric region 177, move the finger to control the cursor 124, and push the finger forward in the air to issue a mouse click. As a practical example, the user may issue a mouse click to minimize, maximize, or close a window in the display 122.

The keyboard 100 can be a computer keyboard, an ergonomic keyboard, a mobile communication text pad, a personal digital assistant keypad, a game control keypad, a set of key buttons on a mouse, or any other suitable user interface system. The sensing unit 110 can be mounted to a keyboard, a mouse, a laptop, an earpiece, a phone, mobile device, or a display. In one arrangement, the sensing unit 110 can include acoustic sensors for generating a sensory space. In another arrangement, the sensing unit 110 can include lasers for generating the sensory space. In another arrangement, the sensing unit can be a plurality of imaging elements such as a video camera, or an optical element, for capturing an image of a finger. A pattern recognition unit within the sensing unit can analyze the images to determine a finger position.

In the continuing example, a user can raise a finger above the keyboard 100 to gain control of the cursor object 124 on the display 122. The sensing unit 110 can detect the finger when the finger is within a sensory space, such as a volumetric region comprising 176 and 177. The sensory space is an approximate three dimensional space (e.g. volume) wherein the sensing unit 110 can detect finger movement. For example, in one particular embodiment, the sensing unit emits high energy acoustic pulses or light signals for detecting a presence of the finger in the sensory space using pulse-echo location. That is, a position of the finger can be determined by listening for echo returns, triangulating a location based on one or more received echoes, and calculating a position of the object.

The sensory space corresponds to a region within which a high energy reflection can be detected. It can also correspond to a region where transmitted signals interfere with reflected signals associated with low signal to noise levels, <−20 dB. The sensory space can be a function of the emitted signal strength and the range. As an example, the sensing unit 110 positioned above the keyboard may only need a range corresponding to the maximum extent of the finger movement. The sensing unit can also include a timer (not shown) for determining a time window for which an activation cue, such as the positioning of a finger in the region 176 or 177, is evaluated. For example, when a user intentionally places a finger within the region 177 for 1 second, the sensing unit 110 identifies the position of the finger and employs the timer to commission control. The timer can provide functions for estimating a time difference or estimating an echo time of arrival.

Figure 2:
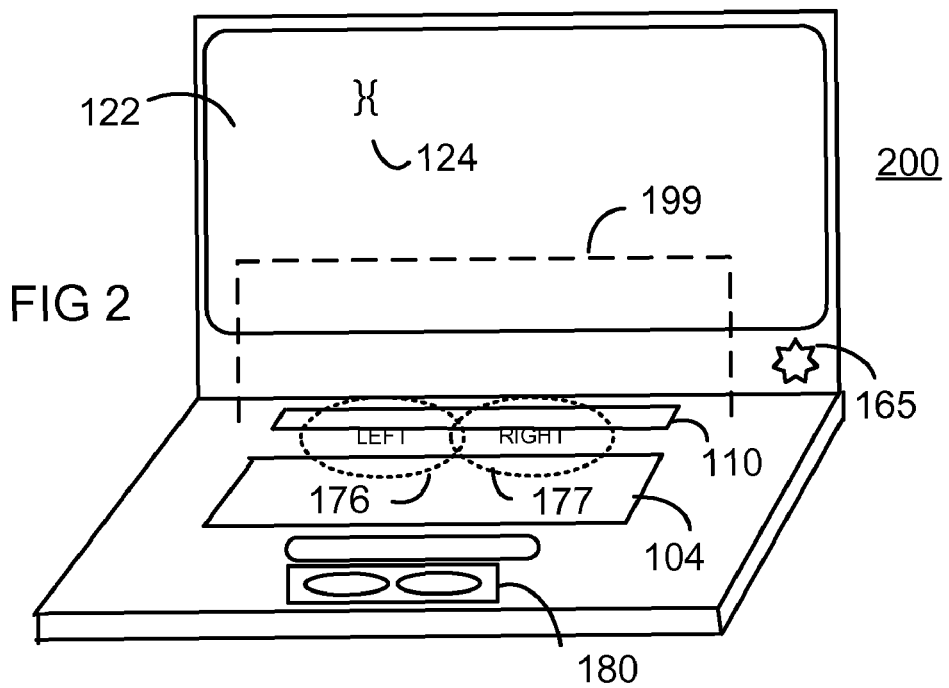
FIG. 2 is an illustration of a touchless sensing unit suitable for use with a mobile device in accordance with an embodiment of the inventive arrangements.

Referring to FIG. 2, an alternate embodiment of the motion sensing device for providing touchless sensing through motion control is shown. The sensing unit 110 can be integrated or attached to a laptop 200 as shown, or with a mobile communication device. Notably, an approximately planar sensory field 199 is shown within the context of the laptop for illustration. The approximately planar sensory field 199 (also called a virtual screen) as shown is approximately parallel to the sensing unit 110 to create the virtual screen. Briefly, a user can raise a finger and penetrate the virtual screen (e.g. approximately planar surface area) to acquire control of the cursor 124, or a component of a user interface in the display. Notably, the virtual screen is planar in comparison to the volumetric regions 176 and 177. That is the virtual screen provides a planar two-dimensional aspect with respect to a sensory space having a three-dimensional aspect.

Figure 3:
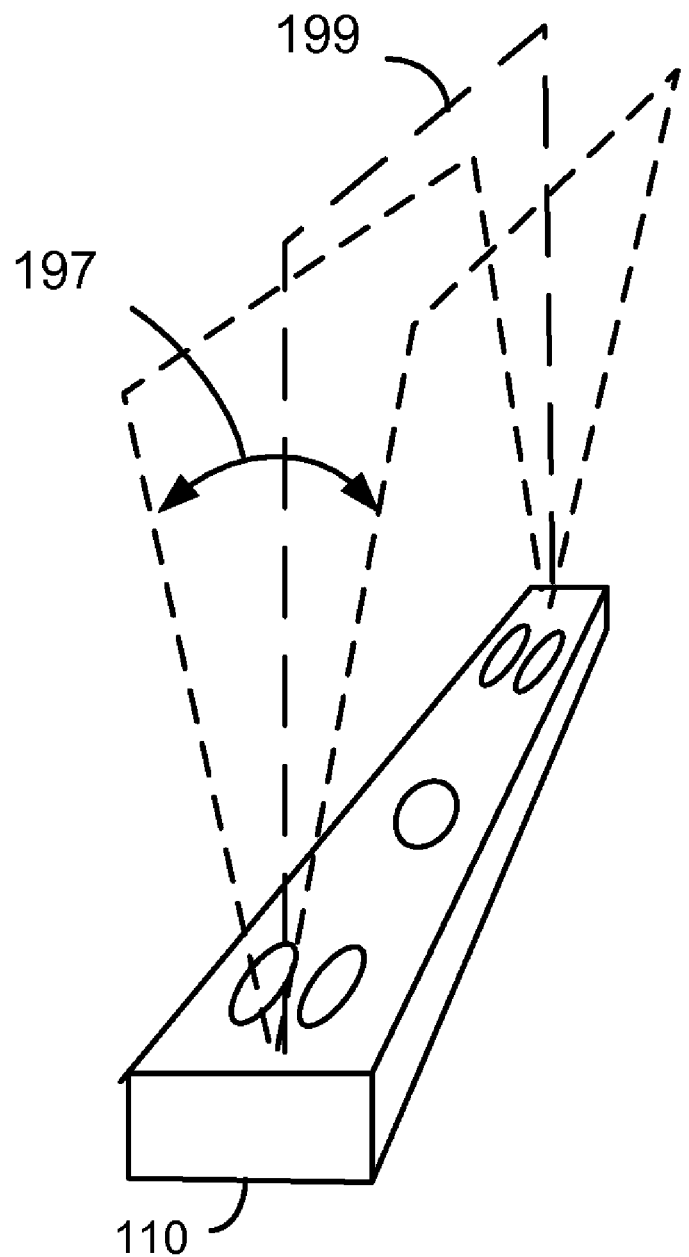
FIG. 3 is an illustration of an approximately planar sensory field in accordance with an embodiment of the inventive arrangements.

Briefly referring to FIG. 3, the approximately planar sensory field 199 is shown. Notably, the approximately planar sensory field 199 can deviate slightly within a bounds 197 which provides a variation for confirming the presence of a finger in the approximately planar sensory field 199. Moreover, the bounds 197 allows the sensory field to lean towards the user thereby allowing a user to lift a finger an penetrate the planar sensory field without having to lift the hand. That is, the inclination angle of the virtual screen can be adjusted. In this arrangement, normal typing motion does not confuse the sensing unit 110 into controlling the cursor. For example, since the sensory space (176-177) is roughly a three-dimensional volume over the keypad 104, the sensing unit 110 may mistakenly attribute hand movement during typing as a signal to acquire cursor control. Understandably, the sensory space (176-177) may be overly broad to make an accurate determination for controlling the cursor, or user interface. In contrast, the approximately planar sensory field 199 is presented in front of the typing movement, yet away from general typing finger movement. As discussed, the virtual screen can be tilted towards the user by physically tilting the sensing unit, or adjusting the bounds 197 of the sensing field. The bounds 197 also correspond to a predetermined range based on proportions of phase angle measurements or time of flight distances. Accordingly, the virtual screen 199 is not restricted to being perpendicular to the keyboard, or parallel the display 122. For example, the virtual screen 199 can be angled towards the user for facilitating touchless sensing. In such an arrangement the user does not need to move the hand forward as much to enter the virtual screen 199.

The same functionality provided by the sensing unit 110 and button pad 180 are available to the laptop 200 embodiment. In one aspect, the sensing unit 110 is flush with a top of the keyboard, or keypad of a mobile device, for allowing the laptop display to close. The sensing unit 110 can also include a lighting element 165 to visually inform the user when the sensing unit is controlling the cursor 124. For example, when a user intentionally raises a finger in region 177 and holds the finger still for a brief moment, the sensing unit 110 considers this action a request for cursor control. Accordingly, the sensing unit 110 adjusts the lighting element to signify control of the cursor 124 has been granted. The light can stay on while the user is controlling the cursor through touchless sensory movements. The light can turn off when the user resumes normal typing or issues a command to relinquish cursor control.

In the continuing example, the sensing unit 110 senses finger movement above the keys 104 within virtual screen 199 to control a cursor object 124 on a monitor 122 (e.g. host display). The sensing unit 110 detects finger movement within the virtual screen 199 without the user having to manually control an input pointing device such as a mouse, a stick, a touchpad, keypad, or, having a physical apparatus connected to the user. The sensing unit 110 maps finger motion, or hand motion, to a coordinate signals for controlling movement of a second object such as a cursor 124, or user interface component. For example, a user controls a cursor 124 using the sensing unit 110 to interact with a computer application for performing tasks such as text editing, web browsing, checking email, messaging, code programming, playing a game, or the like. The sensing unit 110 is not limited to cursor control, and can perform user interface functions associated with finger gesture recognition. Notably, any software program, hardware product, computer, server, internet website, application that can move an object using coordinates can interface directly with the sensing unit 110. The sensing unit 110 can include a connection which allows coordinates to be transmitted to any application that can process data. For example, C++ or Java applications can process the coordinate data and control any objects available to the programming language. As an example, the sensing unit 110 can modify the location of objects in a video game, a presentation, a worksheet, a word document, or the like.

In the following, an exemplary configuration of the sensing system is briefly discussed. Notably, the embodiments of the invention can be practiced using other signal or image processing techniques such as those associated with cameras, infrared sensory, lasers, optical, touchpad, joysticks, or haptic devices. The following embodiment employs ultrasonic sensors only for tutorial purposes, though lasers or other light emitting devices can be similarly used in principle. That is, the same techniques for generating a planar sensory field can be employed using optic, photonic, electromagnetic, and/or acoustic devices.

Figure 4:
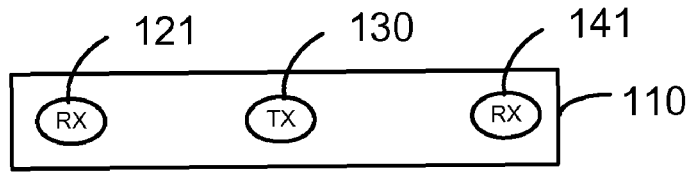
FIG. 4 is an illustration for time of flight measurements in accordance with an embodiment of the inventive arrangements.
Figure 4:
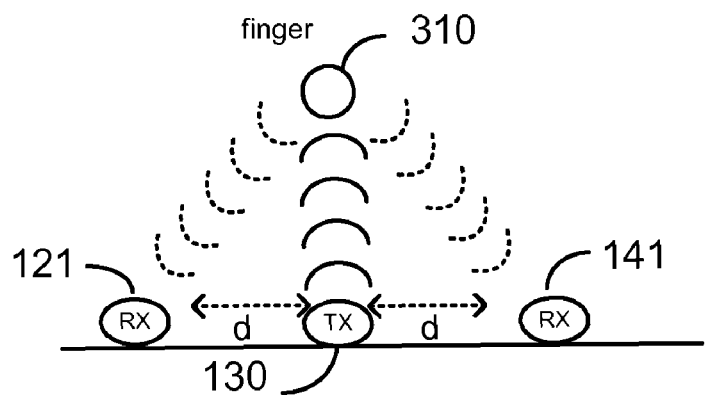
Figure 4:
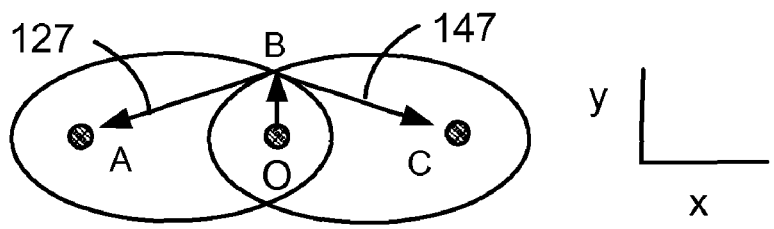
Figure 4:
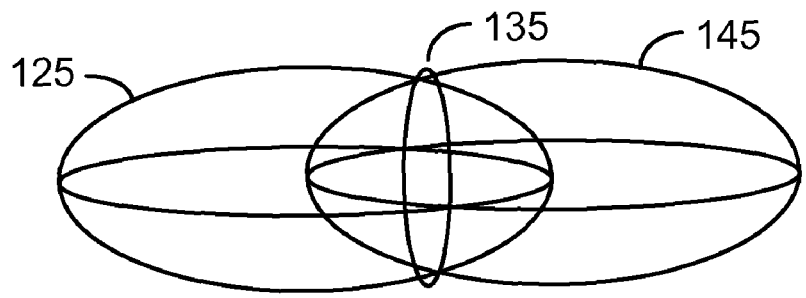

Referring to aspect 410 of FIG. 4, the sensing unit 110 can include at least one transmitter 130 and a plurality of receivers for transmitting and receiving ultrasonic signals. As an example, a left receiver 121 and a right receiver 141 are shown for illustrating principles of transmit and receive signal processing. The transmitter 130 and receiver 121 or 141 can also provide dual transmit and receive functions. In one arrangement, the sensing elements can be an array of ultrasonic transducers, micro-acoustic microphones, micro speakers, or micro-electro mechanical MEMS microphones for transmitting and receiving audio signals. In another arrangement, the sensing element can be CCD camera elements or MEMS camera elements for receiving light. In the case of using ultrasonic sensing elements, the sensing unit 110 can employ pulse-echo detection to estimate a range and position of an object within view of the sensing elements. In this arrangement, the transmitter 130 emits a pulse signal that reflects off an object, such as a finger or stylus, which is detected by a receiver element 121 and 141 in the sensing unit. The receiver elements 121 and 141 are coupled with a detector (not shown) in the sensing unit 110 that detects a signal reflected off an object. The detector can include additional processing logic such as thresholds, comparators, logic gates, clocks, and the like for detecting the object's position and motion in accordance with pulse echo range detection. In one arrangement, the sensing unit 110 can calculate a position of the object based on the reflection by solving a set of geometric equations.

For example, referring to aspect 420 and 430 of FIG. 4, an illustration for time of flight measurements is shown. The sensory unit 110 calculates a first range of an object 310 from the transmitter 130 and receiver 121 pair. The first range 127 can be determined by calculating a first time of flight OBA 127 between the signal transmitted at the transmitter and the echo of the signal reflected off the object 310 received by the receiver 121. A second range 147 can be determined by calculating a second time of flight OBC 147 between the signal transmitted at the transmitter and the echo of the signal reflected off the object 310 received by the receiver 141. A processor within the sensing unit 110 can establish a position (e.g. location) of the object causing the signal reflection by mathematically combining the geometrically related range measurements of the TOF elliptical orbits.

Referring to aspect 440, the elliptical orbit of the first range 127 and the second range 147 each correspond to a three-dimensional surface where the object 310 can reside. Notably, when the object 310 is directly above the transmitter 130, as shown in the geometric model, the first time of flight 127 is approximately the same as the second time of flight 147. Accordingly, a location of the object 310 can be reduced to a two-dimensional surface 135. It should be noted that the sensory space for the sensing unit 110 is roughly the combined volumetric regions 176 and 177, though can be extended to include greater hand motion and finger range. Understandably, the regions 176 and 177 are considered volumetric since the object 310 can be located anywhere in a three-dimensional space above the keyboard 104 (see FIG. 1).

The first time of flight 127 measurement establishes a first volumetric surface 125 and the second time of flight 147 measurement establishes a second volumetric surface 145. Notably, the size of the volumetric surfaces can change depending on the position of the object 310 in the sensory space (176-177). For example, when the object 310 is closer to the sensing unit 110 the volumetric surfaces are smaller. When the object 310 is farther away, the volumetric surfaces are larger. A volumetric surface identifies a surface area where the object 310 can be located. For example, the first time of flight 127 can correspond to any point along the volumetric surface 127. Similarly, the second time of flight 147 can correspond to any point along the volumetric surface 147.

The location of the object, based on the first and second time of flight measurements, corresponds to an intersection 135 of the volumetric surfaces. However, the intersection of two three-dimensional volumetric surfaces is itself a two-dimensional surface. For example, the intersection 135 may be an elliptical or circular locus of points identifying possible locations of the object. Notably, the object may be located anywhere along the elliptical intersection 135. That is, the location may be in a three-dimensional space. The elliptical intersection 135 is too broad of a region to isolate and confirm an exact location of the object 310. Consider that the object 310 can be any point in the locus of points creating the intersection 135. Accordingly, another range measurement is employed to constrain the location of the object 310 to a particular point in the intersection 135. That is, the sensory space (176-177) is narrowed to a planar sensory field in accordance with the embodiments of the invention. In one embodiment, the range measurement is provided by a second receiver that is co-located with a first receiver as a pair.

Figure 5:
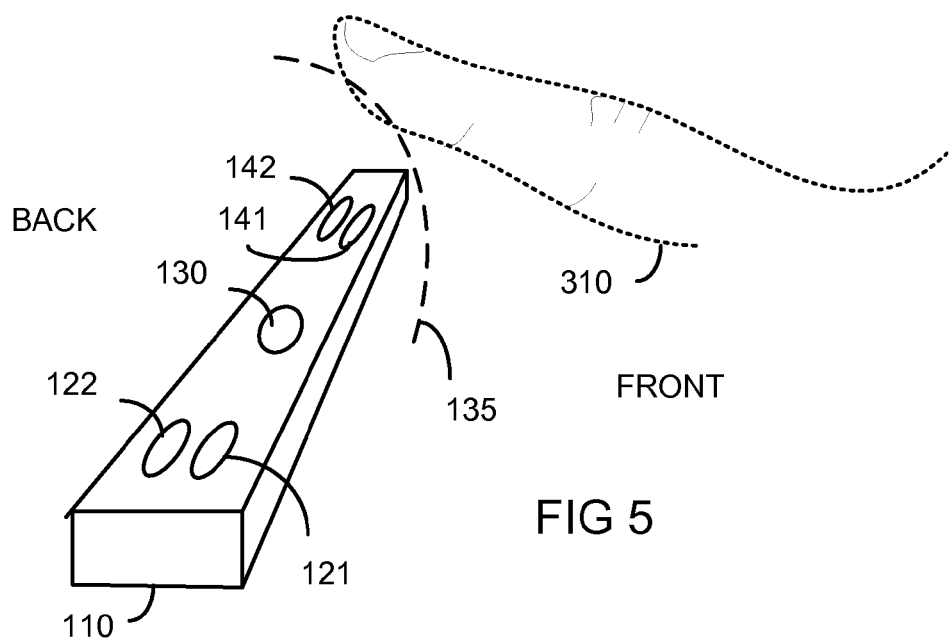
FIG. 5 is an depiction of a touchless sensing unit for detecting a presence of an object in accordance with an embodiment of the inventive arrangements.

Referring to FIG. 5, the sensing unit 110 can employ a paired receiver arrangement as shown. In particular, a first pair of receivers (121 and 122) can be positioned on a left of the sensing unit 110 and a second pair of receivers (141 and 142) can be positioned on a right side of the sensing unit 110. The paired receiver arrangement is not limited to a left and right arrangement. A first receiver 121 and a second receiver 122 of the first pair are oriented in a front back arrangement. The second pair of receivers is similarly oriented.

Notably, the receivers are small enough such that the sensing unit 110 is still relatively slender. For example, the receivers can be MEMS sensors on the order of 1 mm width, length, and height. Moreover, the receivers in a pair can be close enough such that a phase difference between an echo return captured at both receivers is less than a wavelength. For example, the receivers can be positioned at a distance that corresponds to not more than a wavelength separation. A wavelength corresponds to a period of a frequency of the transmitted signal emitted by the transmitter 130. For example, a difference in time of flight measurements can be evaluated to determine if the time of flights are within a predetermined range. The time of flights can also be evaluated to determine if they are within a predetermined proportion, such as 1:2, to account for an inclination of the virtual screen. In the exemplary embodiment, the first pair of receivers (121-122), the transmitter 130, and the second pair of receivers (141-142) are configured in an in-line orientation. That is, they are approximately along a straight line. The in-line paired design of the sensing unit 110 allows for the sensing unit 110 to be placed in-line with a keyboard or keypad such as that shown in FIG. 1, or FIG. 2. As an example, the sensing unit 110 can be integrated between numeric keys at the top of the keypad 104 and below function keys.

Notably, the paired receivers are not restricted to the embodiment shown in FIG. 5. The paired receivers can also be split apart and placed at other locations on the keyboard, or display, for providing a third dimension, if desired. However, such a design could require the receivers to be separated. Understandably, this may increase manufacturing costs since receivers or transmitters are distributed across the entire keyboard or display. In contrast, the in-line arrangement of the sensing unit 110 allows for a single insertion into the keyboard. That is, the sensing unit 110 can be inserted or integrated as one component instead of multiple components dispersed throughout the keyboard 100. It should also be noted that the principles disclosed herein for generating a planar sensory field are not restricted to the closely paired arrangement shown. The receivers can be separated by any predetermined distance, which can be taken into consideration when determining a presence of an object in a sensory space for generating the virtual screen 199 (See FIG. 2).

Notably, the sensing unit 110 can contain multiple sensing elements positioned and arranged in various configurations for receiving range measurements in varying directions for calculating the position and movement of the object causing the reflection using multi-path signal processing techniques. The paired transmit and receive elements can be on a same principal axis or a different principal axis. The sensing unit can also employ beam-forming techniques for estimating the objects location. The sensing unit 110 can attach to a computer for moving a cursor object in accordance with a detected movement. The sensing unit 110 can further produce differential coordinate signals for satisfying the input signal requirements of a PS/2 or USB mouse input device connection interface.

Figure 6:
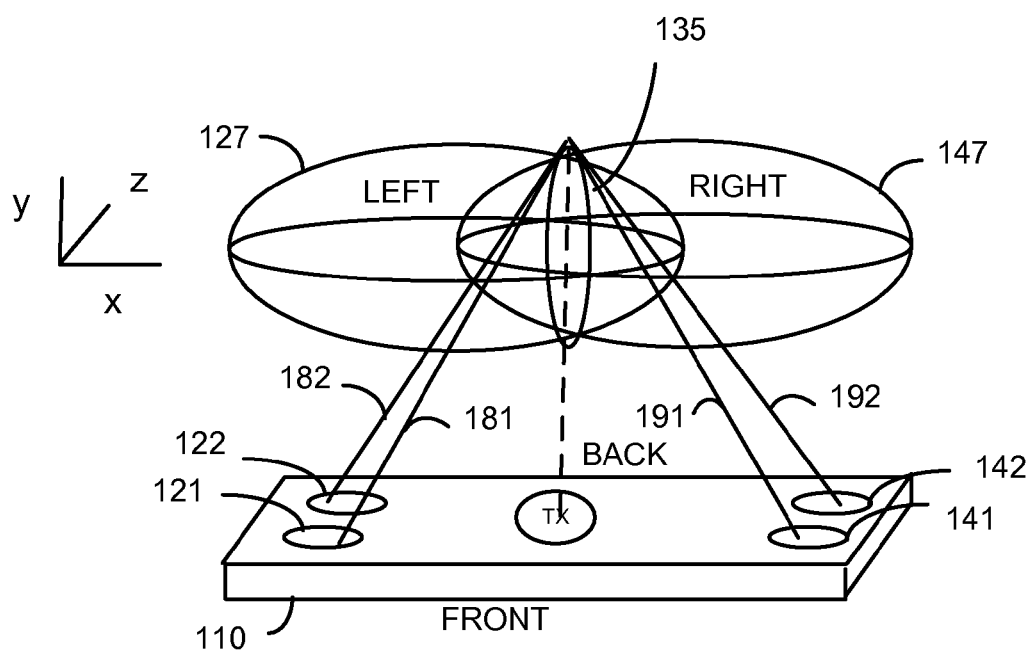
FIG. 6 is a depiction of a sensing unit having paired receivers in accordance with an embodiment of the inventive arrangements.

Referring to FIG. 6, a diagram of the sensing unit 110 showing the paired receiver orientation is presented. In particular, a reference volumetric surface 127 and the corresponding time of flights (TOFs) 181 and 182 are shown. Similarly, a reference volumetric surface 147 and the corresponding time of flights (TOFs) 191 and 192 are shown. Due to the front and back arrangement of the paired receivers, when the object 310 is directly above the sensing unit 110, TOF 181=TOF 182, and TOF 191=TOF 192. When the object is forward of center, TOF 181<TOF 182, and TOF 191<192. When the object is back of center 181>TOF 182, and TOF 191>192. Notably, the front and back orientation of the receivers allows for a determination of when the object is centered above the sensing unit 110 based on TOF measurements. Accordingly, a difference between TOFs can be evaluated to determine when the TOFs are within a predetermined proportion.

More specifically, a phase angle can be measured between two echo returns captured at a pair of receivers for determining a centering of the object within the virtual screen. The predetermined proportion also establishes the inclination angle of the virtual screen. Due to the symmetrical arrangement, a virtual screen can be created with a corresponding inclination angle. For example, as long as the object is centered above the sensing unit 110, the first TOF and second TOF for each pair of receivers will be approximately equal corresponding to a 1:1 ratio. When the object is forward or backward of center, the TOFs measured at both receivers will not be equal. The virtual screen can be generated when a phase angle corresponds to an approximately centered location. Similarly, the virtual screen can be generated for a predetermined proportion of TOF measurements for inclining the virtual screen off-center.

Figure 7:
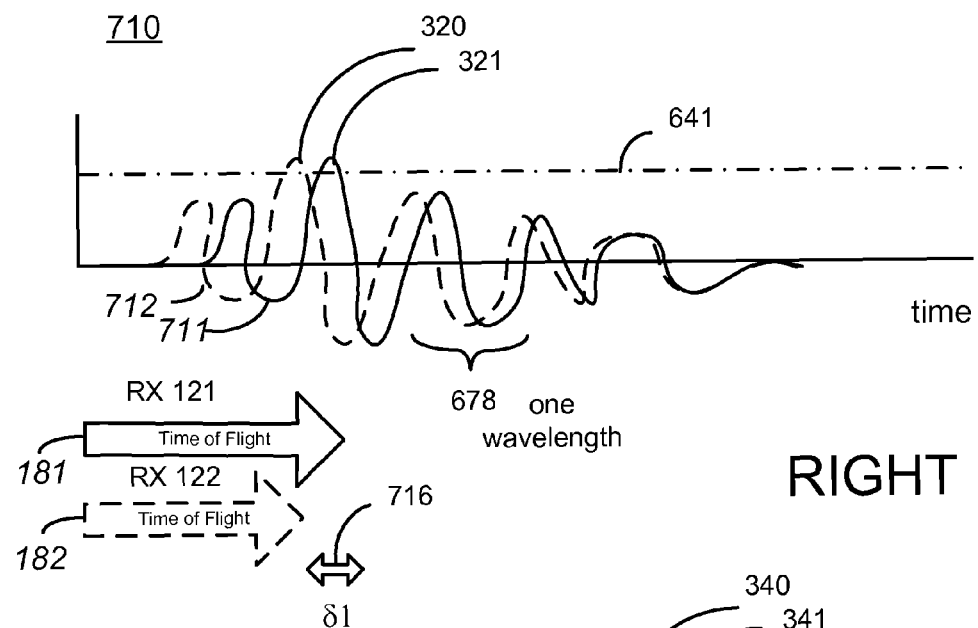
FIG. 7 is an echo signal for estimating phase a difference between paired receivers in accordance with an embodiment of the inventive arrangements.
Figure 7:
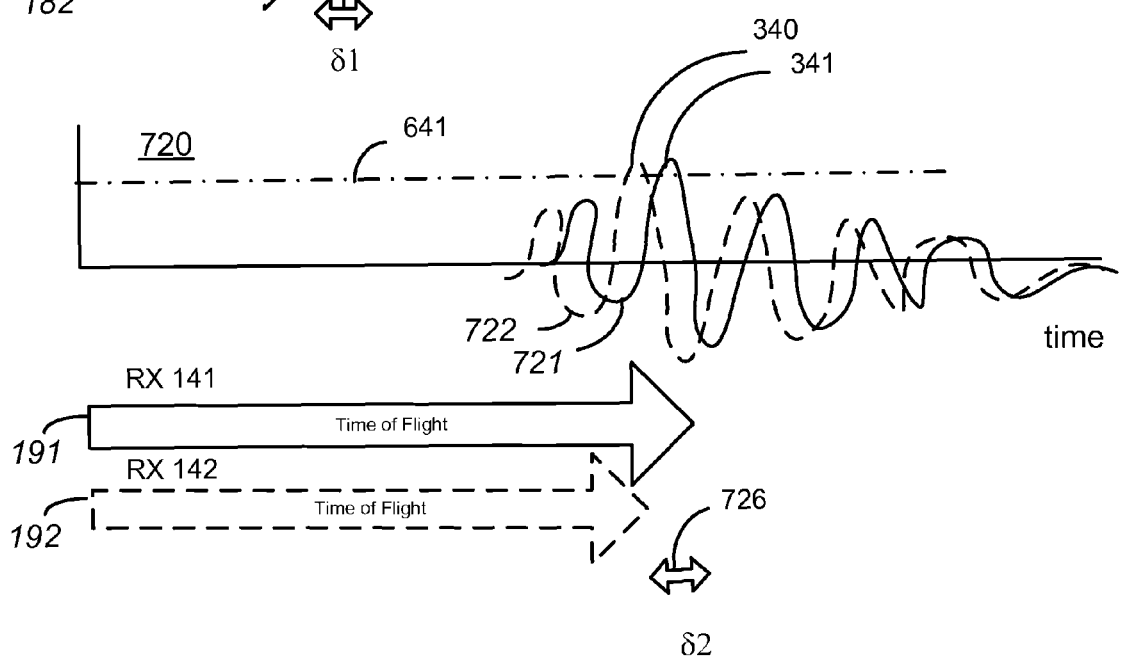

Referring to FIG. 7, the time of flight measurements presented in FIG. 6 are shown with respect to echo returns captured by the paired receivers. Briefly, an exemplary echo return 711 for receiver 121 is shown as the solid line in the top LEFT plot 710. An exemplary echo return 712 for receiver 122 is shown as the dotted line in the top LEFT plot 710. Notably, each receiver 121 and 122 of the paired left receivers each capture an echo return, 711 and 722, respectively. If the echo returns 711 and 712 directly overlaid one another, the object 310 would be centered over the sensing unit 110 (See FIG. 6). In FIG. 7, echo return 711 lags in time (i.e. delayed) echo return 712. For example, the peak 320 of echo return 712 is received in time before the peak 320 of echo return 711. That is, echo return 711 is delayed with respect to echo return 712. Accordingly, the object is back of center. If echo return 711 had lead in time echo return 712, then the object would be forward of center. As illustrated, plot 710 reveals that the object is not centered over sensing unit 110.

An exemplary echo return 721 for receiver 141 is shown as the solid line in the top RIGHT plot 720. An exemplary echo return 722 for receiver 142 is shown as the dotted line in the top RIGHT plot 720. Notably, each receiver 141 and 142 of the paired left receivers each capture an echo return, 721 and 722, respectively. If the echo returns 721 and 722 directly overlaid one another, the object 310 would be centered (i.e., inclination angle of zero) over the sensing unit 110 (See FIG. 6). In FIG. 7, echo return 721 lags in time echo return 722. Accordingly, the object is back of center. If echo return 721 had lead in time echo return 722, then the object would be forward of center. As illustrated, plot 720 reveals that the object is not centered over sensing unit 110.

As an example, a TOF can be calculated by waiting for a peak in an echo return. For instance, the sensing unit 110 can wait unit an echo return exceeds a threshold 614. When a peak is detected above the threshold 641, a TOF can be determined. For example, when peak 320 of signal 712 exceeds threshold 614, the TOF 181 can be determined. The TOF 181 is the time between when the transmitter 130 emitted the signal and when the peak 320 of the echo return 712 captured by receiver 122 was detected. TOF 181 corresponds to the TOF 182 shown in FIG. 6. When peak 321 of signal 711 exceeds the threshold 614, the TOF 182 can be determined. The TOF 182 is the time between when the transmitter 130 emitted the signal and when the peak 321 of the echo return 711 captured by receiver 121 was detected. Once the peaks 320 and 321 are detected, the TOF 181 and 182 can be determined for each of the receivers in a pair of receivers. Then, TOF 181 can be subtracted from TOF 182 to determine a time difference 716.

Plots 710 and 720 are presented merely as illustration to show principles of generating a virtual screen 199 (See FIG. 2) for a zero inclination angle based on an analysis of echo returns. The principles apply to generating a virtual screen at an inclination angle between −90 and 90 degrees of center. It should also be noted that the transmitter receiver paired arrangement is suitable for ultrasonic signals, photonic signals, electromagnetic signals, light signals.

In another aspect a phase angle can be measured from the paired echo returns. For example, a first phase angle for echo return 711 can be determined when the peak 321 exceeds the threshold 614. A second phase angle for echo return 712 can be determined when the peak 321 exceeds the threshold 614. A phase difference can be calculated between the first phase angle and the second phase angle. A phase angle is referenced from zero degrees. Unlike a TOF which is referenced from a base time, a phase angle is referenced from a rotation. For example, the TOF base time generally corresponds to when a signal is transmitted from the transmitter 130. Generally, the time starts at time=0 when the signal is transmitted. When the signal is received, a capture time is recorded. The TOF corresponds to the difference between the time base and the received recorded time. For example TOF 181 is referenced from time=0 as shown in plot 710. A TOF requires keeping track of the transmit time and the receive time. In contrast, a phase angle only requires a receive signal. That is, a phase can be determined based on the received signal alone. More specifically, a phase difference can be determined between two echo signals without reference to a time base. The phase difference also corresponds to the time difference 716. A phase difference calculation may be preferable for real-time applications.

Similarly, referring to plot 720, TOF 191 can be calculated by determining when a peak 341 of echo return 721 exceeds threshold 614. TOF 192 can be calculated by determining when a peak 340 of echo return 722 exceeds threshold 614. Once the peaks 341 and 340 are detected, the TOF 191 and 192 can be determined for each of the receivers in a pair of receivers. For example, TOF 191 can be subtracted from TOF 192 to determine a time difference 726 Similarly, a first phase difference can be calculated between 721 and 722 without reference to a base time. The phase difference also corresponds to the time difference 726. In one aspect, a phase difference can be compared to a wavelength 678 for determining a location of an object within an approximately sensory field.

Figure 8:
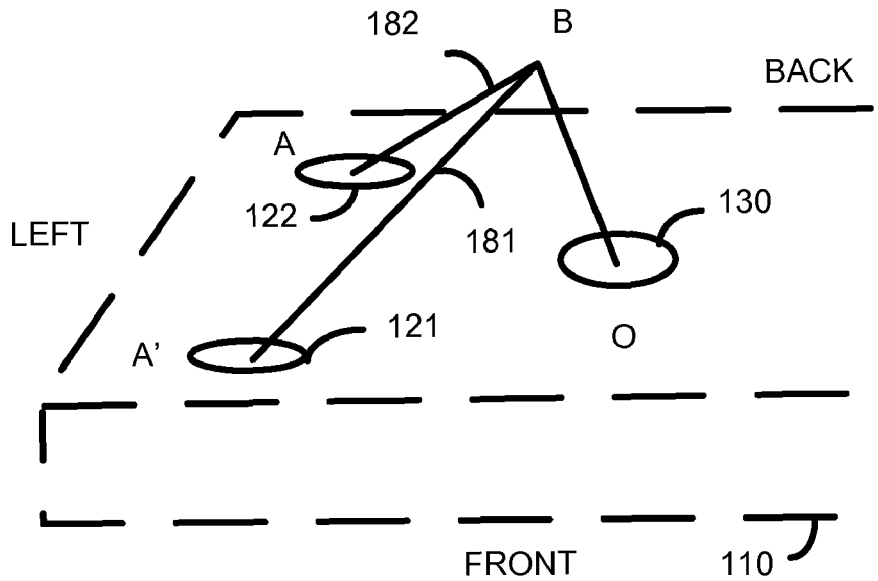
FIG. 8 is a geometrical model for detecting a presence of an object in a sensory field in accordance with an embodiment of the inventive arrangements.
Figure 8:
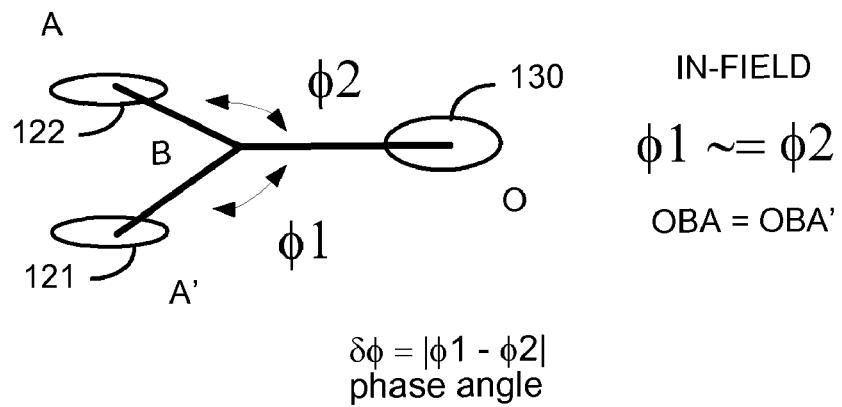
Figure 8:
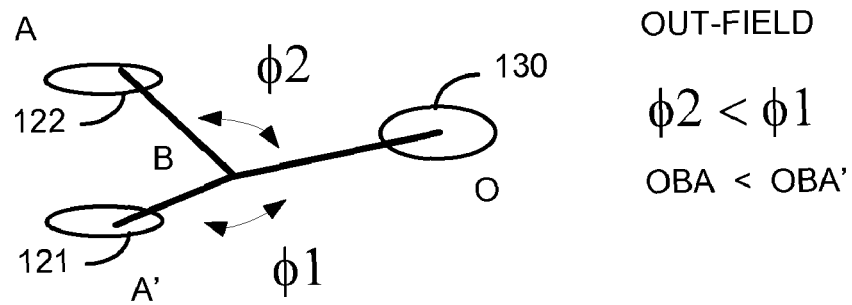

Referring to FIG. 8, a geometrical representation 800 illustrating phase differences in angle notation shown. The geometrical representation 800 provides a means for visualizing phase angles in the touchless sensory field. The geometrical representation 800 illustrates aspects of FIGS. 5-7. For instance, a left side of the sensing unit 110 of FIG. 5 is shown to identify the first receiver pair (121 and 122). The geometric model 800 can be considered symmetrical in operation to the right side of the sensing unit 110. That is, understanding operation of the left side is sufficient for understanding operation the right side. The transmitter 130 is also shown for reference. The first TOF 181 is defined by the triangle OBA and the second TOF 182 is defined by the triangle OBA' (A prime). The TOF 181 and TOF 182 will change depending on the location of the object 310. Notably, when the TOFs change, so does the angle between the TOFs when viewed from a top perspective. For example, φ1 is the angle for TOF 181 and φ2 is the angle for TOF 182. Notably, φ1 or φ2 can correspond to a time difference, a phase angle, a phase difference, or any other measure of difference between received echo signals.

Notably, the angles φ1 and φ2 can be evaluated to determine whether the object is within an approximately planar sensory field. For example, the object 310 can be determined as in-field when the angle φ1=φ2 (i.e. approximately equal) for an virtual screen inclination angle of zero degrees. The object 310 can be determined as out-field when the angle φ1!=φ2 (i.e. not equal) for an virtual screen inclination angle of zero degrees. An out-of-field designation can also occur when φ1>φ2 or φ1<φ2. Notably, a range can exist such that an exact equality is unnecessary. For example, a perturbation factor, δ, can exist which designates the object as in-filed when the angles φ1 and φ2 are approximately equal within a range of perturbation. For example

φ1<|φ2|−δ IN-FIELD

φ1>|φ2|−δ OUT-FIELD

As another example, a range can be defined based on a location of the object 310 and a geometry of the receivers and transmitters of the sensing device 110. For example, if OBA is 150° and OBA' is 150° when the object is directly centered in-line between receiver 121 and 122 based on the geometrical arrangement shown and location of the object 310, a perturbation of 5° can be allotted to the range. For example, so long as φ1−φ2<δ, the object 310 can be considered in-field for an virtual screen inclination angle of zero degrees. The allows for the generation of a virtual screen that takes into account a slight deviation due to a perturbation. Notably, the perturbation depends on where the object is located and the desired inclination angle of the virtual screen. For example, the angles φ1 and φ2 can change depending on where the object 310 is located even if the object 310 is directly centered between receiver 121 and 122. There are many points along the in-line centerline where the object can be located to be directly between the two receivers (i.e. TOF 181=TOF 182). Accordingly, a location of the object can be included in the range measurement for determining the perturbation bounds.

As another example, a phase angle δφ=φ1−φ2 can be measured to within a wavelength of a transmitted frequency for generating a virtual screen. In this case, a location of the object 310 is not needed for establishing bounds. For example, referring back to FIG. 7, the wavelength 678 corresponds to one periodic cycle of an echo return (i.e. the cyclic component demarcated as one wavelength 678 of 711). The phase angle can be measured by evaluating a phase difference between TOF 181 and TOF 182. For example, a processor (not shown) of the sensing unit 110 can calculate the TOFS 181 and 182 and calculate the phase difference. The processor can determine if the phase angle is less than a wavelength, and if so, confirm that the object is within an approximately planar sensory field.

Referring back to FIG. 3, the approximately planar sensory field 199 is shown. The approximately planar sensory field 199 can be generated from the front and back paired receiver arrangement discussed in FIG. 5. In particular, the paired arrangement of the receivers allows for determining if TOF measurements are symmetrical within a bounds. Specifically, a phase difference between echo returns can be evaluated to determine if the phase angle is within a perturbation bounds 197. If the phase angle is within the bounds 197, a presence of the object can be confirmed to be within the approximately planar sensory field 199. An angle of the approximately planar sensory field can be controlled by the bounds 197. For example, the object 310 may be a finger for controlling a cursor object on a display. The finger can be tracked for controlling movement of a cursor object when the finger is within the approximately planar sensory field 199. The approximately planar sensory field may allow for a variation of the finger within the bounds 197 such that control of the cursor is maintained as long as the finger is within the bounds. In practice, this occurs when a phase angle between at least two echo returns is within a range (e.g. bounds 197).

Figure 9:
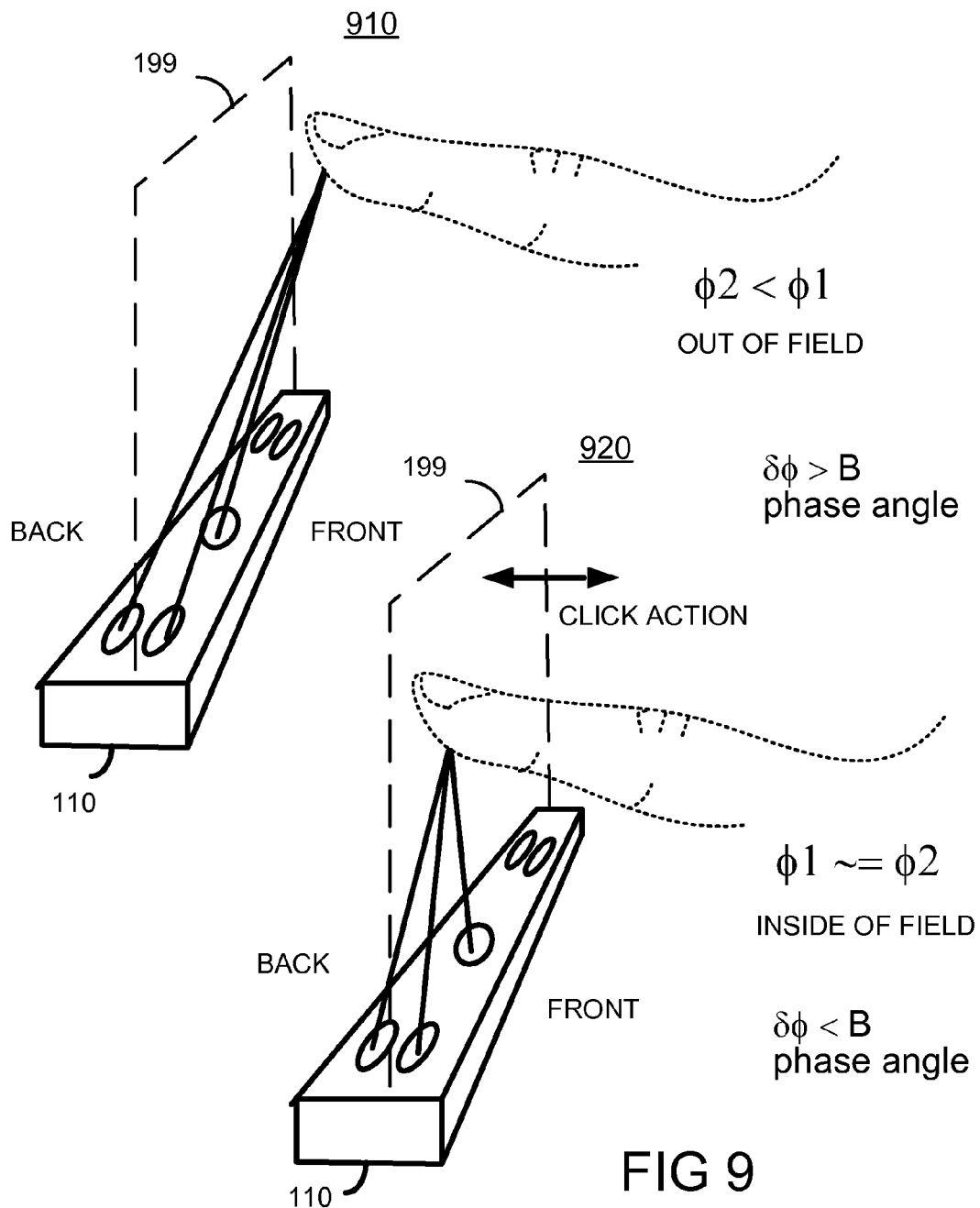
FIG. 9 is an illustration for detecting the presence of an object in a sensory field and acquiring control in accordance with an embodiment of the inventive arrangements.

Referring to FIG. 9, an illustration for detecting the presence of an object in a sensory field and acquiring control is shown. As illustrated in 920, the finger may be out-field when a phase difference between phase angles is less than a predetermined angle (e.g., bounds, B) or proportion (e.g., ratio). For example, briefly referring back to FIG. 7, the finger can be detected as out-of-field when the phase difference is greater than the wavelength 678. When the finger is out-of-field, the cursor object will not move in accordance with a movement of the finger. That is, the finger does not control the cursor object when the finger is out-field. When the finger penetrates the approximately planar sensory field 199, control of the cursor object can be acquired. In this case, the user can move the finger within the planar sensory field, and the cursor object can move in accordance with the finger movement. In one aspect, a determination can be made that the finger is approaching when the phase difference decreases, and a determination can be made that the object is leaving when the phase difference increases. The method can further include tracking a movement of the object in the sensory space, moving a cursor in accordance with the movement, and generating a mouse click action in response to the object approaching, or in response to the object leaving.

In another arrangement, the user can control a user interface or manipulate objects. As previously noted, the coordinates of the finger or finger motion in the planar sensory field 199 can be used as input to a variety of applications, and not limited to cursor control or user interface control. For example, an application can be a kiosk, or keypad entry system, wherein the user can press buttons on a virtual screen in a touchless manner. Visual feedback of the location of the finger relative to the application may or may not be provided. Moreover the user can select objects in the application by projecting the finger forward, finger gestures, or through voice activated commands. As an example, the user can issue a click action to perform task such as minimizing, maximizing, or closing a window. Other arrangements are herein contemplated such as dialing a phone, scrolling through commands, scrolling through documents, manipulating objects in a video display, and the like.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for determining a presence of an object comprising:
   detecting a movement and location of an object within a sensory space by tracking ultrasonic signals directed to and reflected off the object;
   estimating a phase angle of received waveforms for each of three transmit and receive pair transducers generating the sensory space;
   saving a history of received ultrasonic waveforms reflected off the object to within a predetermined time range according to the phase angle;
   creating a three-dimensional volumetric surface from the phase angles for each of the transmit and receive pair transducers
   calculating therefrom a broad intersection region of the three-dimensional volumetric surfaces;
   in addition to the phase angle, estimating a phase difference between successively received ultrasonic waveforms in the history of the movement;
   evaluating the phase difference to less than a wavelength of the received ultrasonic signals where the phase angle of the ultrasonic waveforms is within the predetermined range, and
   constraining the location of the object to a particular point within the intersection of the three-dimensional volumetric surfaces from the phase difference;
   and,
   resolving the location of the object with approximately a positional accuracy of one millimeter in the sensory space.

2. The method of claim 1, wherein the wavelength is the ratio of the speed of sound to the ultrasonic signal fundamental frequency, and the fundamental frequency is between 40 Khz and 120 KHz.

3. The method of claim 1, wherein the estimating a phase angle comprises:
   estimating a first time of flight for the object based on peak detection of a first reflection of a transmitted signal from the object;
   estimating a second time of flight for the object based on peak detection of a second reflection of the transmitted signal from the object; and
   comparing the first time of flight with the second time of flight, and if the first time of flight within a predetermined proportion to the second time of flight, confirming the presence of the object within the approximately sensory space.

4. The method of claim 1, further comprising:
   determining that the object is approaching when the phase angle measured from successive waveforms captured and stored in the history decreases; and
   determining that the object is leaving when the phase angle measured from successive waveforms captured and stored in the history increases.

5. The method of claim 1, further comprising generating the sensory field by:
   transmitting a plurality of ultrasonic signal pulses with a fundamental frequency between 40 Khz and 120 KHz;
   detecting a first echo from a first reflection of the ultrasonic signal pulse off the object from a first sensor;
   detecting a second echo from a second reflection of the ultrasonic signal pulse off the object from a second sensor;
   estimating the first distance of the object within the sensory field based on a time of flight measurement from the first reflection; and
   estimating the second distance of the object within the sensory space based on a time of flight measurement from the second reflection
   where the wavelength is the ratio of the speed of sound to the ultrasonic signal fundamental frequency.

6. The method of claim 1, wherein the detecting a movement of an object comprises tracking a finger or stylus moving within an ultrasonic sensing space.

7. A sensing unit for accurately determining a location of an object comprising:
- at least one transmitter for transmitting a plurality of ultrasonic signal pulses;
- at least three receivers for each respectively capturing a first reflection and a second reflection of the ultrasonic signal pulses from an object in a sensing space created by the at least one transmitter and receivers; and
- a processor for accurately detecting a location and movement of an object within the sensory field by:
  - tracking ultrasonic signals directed to and reflected off the object,
  - saving received ultrasonic signals reflected off the object to memory,
  - estimating a phase angle of received ultrasonic signals in the history of the movement;
  - in addition to the phase angle, estimating a phase difference between peak amplitudes of successively received ultrasonic signals in the history
  - creating a three-dimensional volumetric surface from the phase angle for transmit and receiver pairs and calculating therefrom an intersection of the three-dimensional volumetric surfaces; and
  - evaluating the phase difference to is less than a wavelength of the received ultrasonic signals where the wavelength is the ratio of the speed of sound to the ultrasonic signal fundamental frequency that is between 40 Khz and 120 KHz, and the phase angle is within a predetermined time of flight range, and locating the object with a positional accuracy on the order of one millimeter in the sensory space by constraining the detected location of the object to an intersection point of the three-dimensional volumetric surfaces from the phase difference.

8. The sensing unit of claim 7, further comprising:
- a second pair of receivers for capturing a first reflection and a second reflection of the signal from the object in a sensing field created by the transmitter,
- wherein the first pair of receivers, the second pair of receivers, and the at least one transmitter are positioned approximately in-line to one another.

9. The sensing unit of claim 8, wherein a first receiver and a second receiver of each pair of receivers are positioned in an approximately front and back orientation with respect to the in-line orientation of the first pair of receivers, the second pair of receivers, and the at least one transmitter.

10. The sensing unit of claim 8, wherein processor
- calculates a first phase angle of the object in the sensory field;
- calculates a second phase angle of the object in the sensory field; and
- compares the first phase angle with the second phase angle to produce a phase difference, and if the phase difference is within the wavelength,
- confirms the presence and location of the object within the approximately sensory field of the sensory space
- where the wavelength corresponds to a period of the ultrasonic signals transmitted frequency and the period is defined as the time between ultrasonic signals pulses and is the inverse of the fundamental frequency.

11. The sensing unit of claim 8, further comprising:
- a visual element for identifying the presence of the object within the sensory field.

12. The sensing unit of claim 8, wherein the transmitter is an ultrasonic transmitter or light source, and the receivers are micro-electromechanical (MEMS) microphones having ultrasonic sensitivity.

13. A method for accurate ultrasonic sensing, comprising:
- emitting a plurality of ultrasonic signals in air from a transmitter with a fundamental frequency between 40 to 120 KHz for generating a sensory space therein;
- detecting a location and movement of an object within the sensory space by tracking the ultrasonic signals directed to and reflected off the object;
- saving a history of received ultrasonic signals reflected off the object within a predetermined range;
- estimating a phase angle of the received ultrasonic signals stored in the history of the movement for each transmitter and receiver pair;
- estimating a phase difference between peak amplitudes of successively received ultrasonic signals stored in the history for each transmitter and receiver pair, and
- creating a three-dimensional volumetric surface from the phase angle measurements for each of three transmit and receive pair transducers and calculating therefrom an intersection of the three-dimensional volumetric surfaces;
- constraining the location of the object to a region within the intersection of the three-dimensional volumetric surfaces by evaluating the phase difference to less than a wavelength of the received ultrasonic signals;
- determining that the object is at a location with approximately a positional accuracy of one millimeter in the sensory space when the phase difference is less than a wavelength of the received ultrasonic signals and the phase angle is within the predetermined range, where the wavelength is the ratio of the speed of sound to the ultrasonic signal fundamental frequency, and the fundamental frequency is between 40 Khz and 120 KHz.

14. The method of claim 13, further comprising:
- estimating a first time of flight based on a first reflection received at a first receiver of a receiver pair;
- estimating a second time of flight based on a second reflection received at a second receiver of a receiver pair;
- evaluating a time difference between the first time of flight and the second time of flight; and
- confirming a presence of the object within the approximately planar sensory space.

15. The method of claim 13, wherein the determining further comprises:
- evaluating whether a phase difference between a first echo signal indicating the first time of flight and a second echo signal indicating the second time of flight is less than a wavelength of the transmitted signal.

* * * * *